June 20, 1967  M. N. MURRAY  3,326,521
NEEDLE VALVE
Filed May 18, 1964
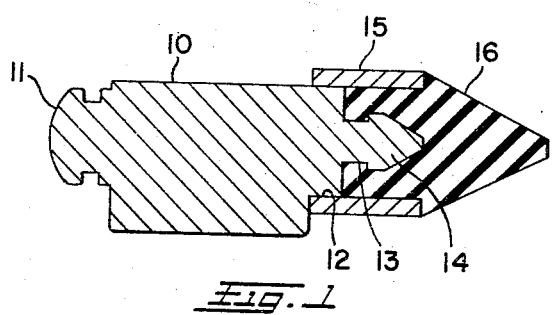
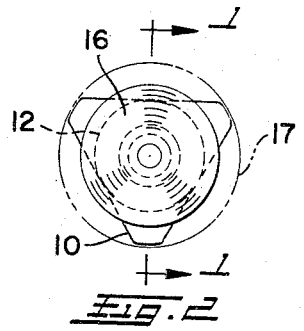
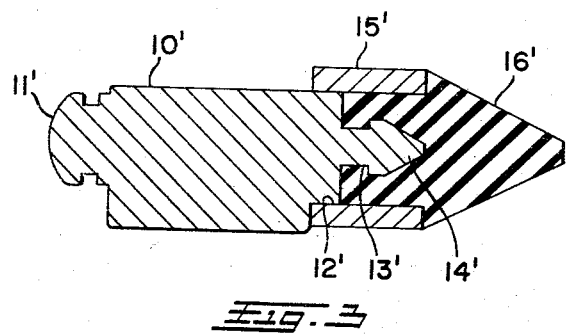
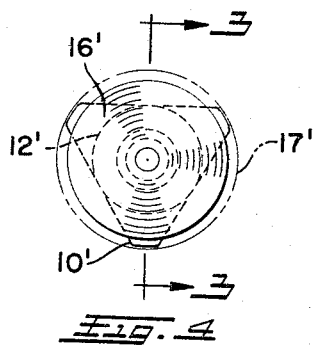
INVENTOR.
MYLES N. MURRAY
BY
*Oberlin, Maky & Donnelly*
ATTORNEYS

United States Patent Office 3,326,521  
Patented June 20, 1967

3,326,521  
NEEDLE VALVE  
Myles N. Murray, Chagrin Falls, Ohio, assignor to Industrial Electronic Rubber Company, Twinsburg, Ohio, a corporation of Ohio  
Filed May 18, 1964, Ser. No. 368,151  
4 Claims. (Cl. 251—358)

The present improvements relate to needle valves, as indicated, and are more particularly concerned with that type of needle valve element which comprises a protruding tip of resilient material at one end of a rigid body member.

The needle valve element of this last class which is now being used in fuel inlet valve assemblies of carburetors for internal combustion engines, formerly exclusively made of metal, is a more specific type of valve element to which this invention pertains, whereby a more specific embodiment would ordinarily comprise an element having an elongate metal body and a rubber tip. The manufacture of such valve elements has entailed the use of extruded metal stock of a cross-sectional shape which is not coincident with the shape of the passage in which this body will be disposed in use, so that the body may be guided in the passage by only limited contact therewith and will permit the flow of fuel along the length of the body. For example, it has been the practice to employ such metal bodies of triangular or square cross-sectional shape to be disposed within cylindrical fuel inlets and thus defining longitudinal passages between the body and the inlet at the flat sides of the former. It has also been proposed, for the same purpose, to use an elongated metal body which is fluted about its periphery or serrated to provide in each case the necessary combination of limited supporting and guiding contact, the movement being axial, and the non-obstructed peripheral spaces for the flow of the fuel.

The several such body forms are, as indicated, usually made from extruded metal stock, since this type of production is the most convenient and inexpensive in permitting continuous manufacture of the stock to the controlled cross-sectional shape. The thus formed metal stock for the body member is cut at intervals determined by the desired length for a given valve element, and the individual body members have heretofore been subsequently provided with cylindrical turned extensions at the tip end, with this operation being performed on a screw machine. The tip of rubber or other resilient material is applied against this turned end of the body usually by molding a generally conical tip with some anchoring interfit with the body end, for example, in a tapped socket. The end result is, of course, in accordance with existing procedures, a needle valve element having a firmly attached tip molded in place and projecting from the cylindrical collar or extension of the body end.

The conventional manufacture above discussed is inherently limited in respect of the base diameter of the resilient tip, with this dimension being no greater than the diameter of the turned cylindrical end of the rigid body against which the tip base is formed in the molding step. It will also be appreciated that the size of this cylindrical end section is limited to the diameter of the circle which can be circumscribed by the particular geometrical configuration of the main body, since the former is turned from stock having initially uniformly the shape of the latter. In other words, these relationships are such that the rigid body shape and dimensioning impose a very definite restriction on the size of the tip which can thus be applied in the customary manner, and this characteristic has only indirect relation to the actual requirements of sizing of the flow passages along the body in the full valve assembly in which the element is to be used.

It has also been more recently desired to employ resilient tips in such valve elements of relatively large size or of theoretically large included angle in the generally conical form, without the necessity also of increasing the size of the metal body itself. The larger tip size has been found preferred in some applications and offers a wider range of valving. The limitation has therefore not only been noted, but recognized as presenting a problem of practical concern.

It is accordingly a principal object of the present invention to provide a needle valve element of resilient tip type in which the tip size is not subject to the noted usual size limiting relation to the rigid body member of the element.

Another object is to provide a resilient tip needle valve element in which the tip is generally conical and the body flat-sided, with the base diameter of the tip greater than that of a circle circumscribed by the cross-sectional shape of the body.

Another object is to provide such a valve element in which the size of the resilient tip can readably controllably be varied in manufacture of the element over a fairly wide range relative to the size of the body member.

It is a further object of the invention to provide such a valve element with improved locking of the resilient tip to the body member.

An additional object is to provide a method for producing an improved needle valve element having the above-noted characteristics.

Other objects and advantages of the present invention will become apparent as the following description proceeds.

To the accomplishment of the foregoing and related ends the invention, then, comprises the features hereinafter fully described and particularly pointed out in the claims, the following description and the annexed drawing setting forth in detail a certain illustrative embodiment of the invention, this being indicative, however, of but one of the various ways in which the principle of the invention may be employed.

In said annexed drawing:

FIG. 1 is a longitudinal cross-section of a resilient tip needle valve element in accordance with the present invention;

FIG. 2 is an end view of such element, from the tip end and with the longitudinal section of FIG. 1 indicated therein by the line 1—1;

FIG. 3 is a view similar to FIG. 1 showing the element with a different size of resilient tip; and FIG. 4 is a similar end view of the FIG. 3 element wherein the section of the latter is indicated by the line 3—3.

With reference now to the drawing in detail, the illustrated embodiment of the invention is in the form of a carburetor fuel inlet valve having a rigid elongated body 10, which is preferably made of metal as previously used in carburetors for internal combustion engines and the like. The body will thus ordinarily be made of stainless steel or brass, these being the typical metals employed in view of the exposure to gasoline in the indicated use, although it will clearly be understood that any rigid composition compatible for the intended operating environment can be used.

The form of the elongated body 10 is shown as generally triangular, and this body will ordinarily be produced by stock extrusion as a continuous blank of the cross-sectional shape and then severed into appropriate lengths, with the latter turned at the ends in a conventional screw machine operation as hereinafter set forth. Since this particular valve element is to be employed for the noted carburetor use, it is provided by such an operation at one end with a stem and head portion 11 for attachment to a float arm, but this formation is not material to the present improvements or the understanding thereof. At its other end, the body 10 is turned to provide a first cylindrical axial section 12, a reduced neck 13 continuing outwardly, and a relatively enlarged and generally conical head 14. It will be observed that the diameter of the section 12 is the largest diameter cylindrical extension which can be provided by turning of the triangular shaped body stock. Accordingly, if conventional techniques were followed for applying a resilient tip of general conical formation to this body, the tip size would be limited to this base diameter. However, the present invention completely avoids this restriction on tip or head size by the addition of a rigid, preferably metallic, sleeve 15 which is press-fitted about the section 12. This sleeve has a pre-determined wall thickness to provide an added extension from the end of the body having an outside diameter which is, of course, greater by the wall thickness than the diameter of the section 12 and selected to provide the desired increased size of tip. The sleeve also extends as shown approximately to the end of the integral spear-like formation 13, 14 of the body, so that it defines with the latter a recess which is generally annular but has an irregular inner wall configuration corresponding to the peripheral shape of the sections 13 and 14.

The body 10, with the sleeve 15 attached, is placed in a mold suitable for molding thereon of a tip 16 made of a rubber or other resilient composition again selected for its compatibility to the liquids or fluids to which it will be exposed in use. The operation is preferably one of injection molding, and it will be seen that the molding composition of the illustrated element fully fills the end recess defined by the sleeve 15 and the encircled sections 13, 14 of the body and forms a protruding tip of conical shape. There may of course be some distortion due to shrinkage in the curing of the composition, but these considerations are also unimportant in respect of the novelty of the present improvements of the invention and the true conical form has been shown more simply for convenience. The encasement of the body end spear 13, 14 by the shank of the resilient tip serves to lock the tip in place, and adhesive can if desired be employed for firmness of the attachment of the tip.

In FIG. 2, the dashed line 17 is intended to represent a cylindrical passage in which this valve element would be employed, and it is approximately a circle at such a radius about the axis of the body to inscribe the same. By comparing in this figure the dashed outside diameter of the body end section 12 with the circle which constitutes the base of the tip in full line, it will be very clearly appreciated that this new element avoids the ordinary size limitations first discussed herein of prior elements of this type. The element in such relation provides an annular clearance about the tip which would in the indicated use be of the width of the space between the tip base and the circle 17.

FIGS. 3 and 4 respectively correspond to FIGS. 1 and 2, with the reference numerals of the latter primed in the former, and these additional illustrations have been included to show the control or variation in tip size which can be realized by this invention. It will thus appear that the sleeve 15' is of a different selected wall thickness than sleeve 15 first illustrated and that this dimensional increase provides a still larger base diameter for the tip 16'. As most clearly evident from the end view of FIG. 4 the normal expected base diameter for the tip has been very substantially increased and, of course, the annular passage between the tip 16' and the representative bore 17' has been correspondingly reduced in width. In this last connection, it will be appreciated that the new valve element can be produced with a wide variety of sleeves of varying wall thicknesses for desired tip size control up to the point at which the annular clearance around the base of the tip and the passage in which the element is to be disposed is of the minimum operative width.

Although the body has been shown to be of triangular cross-section, it will be obvious that the same considerations apply as well in the use of a body of square section and other shapes which are not coincident with the passage in which the particular element is to be disposed in use. The illustrated employment of an integral locking spear for the tip, formed by the sections 13 and 14, is quite inexpensive, especially as compared to the more conventional expedient of tapping a socket in the body end or otherwise using locking threads, and the spear formation does not of course require any finishing; it can in fact be a quite rough machined formation. The exact shape of this locking spear can also vary, the prime effect being realized from the fact that there is formed a recess with the encircling sleeve having a variable contour for the desired anchoring effect on the tip. Moreover, it is possible that this idea of a locking spear form within the sleeve could be realized by forming a separate head of the illustrated or equivalent shape and suitably affixing the same on the end of the body member.

As will also be recognized, the sleeve component utilized in the invention is a relatively inexpensive part, especially as compared to the stock required and necessarily wasted to produce an equivalent of the body-sleeve assembly from a single piece of the metal or other rigid material used. The steps of forming the body end for reception of the sleeve and applying the latter are obviously economical and easy to accomplish.

Other modes of applying the principle of the invention may be employed, change being made as regards the details described, provided the features stated in any of the following claims or the equivalent of such be employed.

I, therefore, particularly point out and distinctly claim as my invention:

1. A needle valve element comprising a rigid body member of noncircular cross-sectional shape, a cylindrical extension of small axial extent formed at one end of said body member integral therewith, the diameter of said extension being no greater than that of a circle circumscribed by the cross-sectional shape of the body member, an extender sleeve secured over said cylindrical extension and projecting therebeyond, the sleeve defining a recess at the end of the body member, and resilient material received at least in part in the recess thus formed by the extender sleeve, said resilient material also protruding in part from the outer end of the extender sleeve and overlying such end at its immediately adjacent protruding portion.

2. A needle valve element comprising a rigid body member of noncircular cross-sectional shape, a cylindrical extension of small axial extent formed at one end of said body member integral therewith, the diameter of said extension being no greater than that of a circle circumscribed by the cross-sectional shape of the body member, an extender sleeve secured over said cylindrical extension and projecting therebeyond, the sleeve defining a recess at the end of the body member, and resilient material molded on the body member with a portion thereof in the recess thus formed by the extender sleeve and a portion protruding therefrom, the protruding portion being of general conical shape and having its base overlying the end of the extender sleeve.

3. A needle valve element comprising a rigid body member of noncircular cross-sectional shape, a cylindrical extension of small axial extent formed at one end of said body member integral therewith, the diameter of said extension being no greater than that of a circle circumscribed by the cross-sectional shape of the body member, an extender sleeve secured over said cylindrical extension and projecting therebeyond, the sleeve defining a recess at the end of the body member and the latter being provided with a reduced projection of head-like formation within such recess, and resilient material molded on the body member with a portion engaged about and thus anchored in place by said reduced projection and another portion protruding at the end of the extender sleeve, said protruding portion being of generally conical shape and having its base overlying the end of the sleeve.

4. A needle valve element as set forth in claim 3 wherein the body member has flat sides, and the extender sleeve has a predetermined outer diameter greater by the wall thickness of the sleeve than said cylindrical extention such that the sleeve projects beyond the flat sides of the body member.

References Cited

UNITED STATES PATENTS

| | | | |
|---|---|---|---|
| 1,787,601 | 1/1931 | Swanberg | 137—436 |
| 1,963,685 | 6/1934 | Shimer | 251—357 X |
| 2,225,541 | 12/1940 | Werner | 251—357 X |
| 2,371,830 | 3/1945 | Langdon | 137—436 X |
| 3,086,750 | 4/1963 | Carlson et al. | 137—434 X |
| 3,090,596 | 5/1963 | Gifford | 251—357 X |
| 3,206,165 | 9/1965 | Salmon et al. | 251—357 X |

FOREIGN PATENTS

| | | |
|---|---|---|
| 447,656 | 10/1951 | Canada. |
| 478,627 | 11/1951 | Canada. |
| 943 | 1884 | Great Britain. |

M. CAREY NELSON, *Primary Examiner.*

S. SCOTT, *Assistant Examiner.*